US011243908B2

(12) United States Patent
Lee et al.

(10) Patent No.: US 11,243,908 B2

(45) Date of Patent: Feb. 8, 2022

(54) REPORT SNAPSHOTS

(71) Applicant: Sage Intacct, Inc., San Jose, CA (US)

(72) Inventors: Chetan Lee, Bangalore (IN); Valer Crisan, San Jose, CA (US)

(73) Assignee: Sage Intacct, Inc., San Jose, CA (US)

( * ) Notice: Subject to any disclaimer, the term of this patent is extended or adjusted under 35 U.S.C. 154(b) by 426 days.

(21) Appl. No.: 16/284,909

(22) Filed: Feb. 25, 2019

(65) Prior Publication Data

US 2020/0272599 A1 Aug. 27, 2020

(51) Int. Cl.

*G06F 16/11* (2019.01)
*G06F 11/14* (2006.01)

(52) U.S. Cl.

CPC ........ *G06F 16/128* (2019.01); *G06F 11/1458* (2013.01); *G06F 2201/805* (2013.01); *G06F 2201/835* (2013.01); *G06F 2201/84* (2013.01)

(58) Field of Classification Search

None

See application file for complete search history.

(56) References Cited

U.S. PATENT DOCUMENTS

2014/0372394 A1* 12/2014 Frankel ................. G06F 16/128 707/703
2015/0264002 A1* 9/2015 Vlachogiannis ........ H04L 51/34 709/206
2015/0310006 A1* 10/2015 Becker .................. G16C 20/90 707/608
2016/0055300 A1* 2/2016 Ganesh .................. G16H 10/60 705/3
2019/0236160 A1* 8/2019 Wang .................... G06F 16/358

* cited by examiner

*Primary Examiner* — Amresh Singh

(74) *Attorney, Agent, or Firm* — Raubvogel Law Office

(57) ABSTRACT

Users requesting a report are given the option of generating a live report or viewing a previous generated "report snapshot", which may be a version of the report that was previously generated and stored. The report snapshot may have been generated in response to a previous request for the report, or it may have been generated automatically in response to some trigger event or on a period basis. In response to the user's selection of a live report, the report is generated from data stored in a database, and provided to the user when ready. In addition, the live report is stored as a report snapshot in a storage device. In response to the user's selection of a snapshot, the previously generated report snapshot is retrieved from the storage device and provided to the user. Multiple snapshots for the same report can be made available.

34 Claims, 8 Drawing Sheets

101
Client Device
202
Display Screen
207
Browser
110 User
120
Report Request
121
Live report or snapshot
100
104
Application Server
120A
Live Report Request
120B
Snapshot Report Request
105
Report Generation Module
106
Database Server
Store snapshot of live report
107
Live Data Storage
108
Live Data
109
Report Snapshot Storage
111
Report Snapshots

REPORT SNAPSHOTS

TECHNICAL FIELD

The present document relates to systems and methods for generating, updating, storing, and delivering reports.

BACKGROUND

In many cloud-based environments, report generation can be a lengthy process, due to various factors such as system load, bandwidth, complexity of reports being generated, and/or the amount of data involved. Users may request reports and then have to wait for an excessively long period of time before the report is delivered and displayed. This tests the patience of users, and diminishes the quality of the user experience.

In some situations, when the most up-to-date information is needed, such delays are unavoidable. However, there are times when the same report may be requested by different users within a relatively short period of time, such as within a day. In such situations, repeated generation of the same (or similar) report can be wasteful and can result in unnecessary delays and a sub-par user experience.

SUMMARY

According to various embodiments, users requesting a report are given the option of generating a live ("fresh") report or viewing a previous generated "report snapshot", which may be a version of the report that was previously generated and stored (or cached). The report snapshot may have been generated in response to a previous request for the report, or it may have been generated automatically in response to some trigger event or on a periodic basis.

In at least one embodiment, user interface elements are provided that indicate the "freshness", or age, of one or more previously generated snapshots, so that the user can decide whether to request a snapshot or a newly generated version of the report. In at least one embodiment, additional information can be provided to help the user make this decision, including for example, certain parameters or settings that may have been applied when each snapshot was generated, an estimated time to generate a new version, and/or the like.

In at least one embodiment, in response to the user's selection of a live report, the report is generated from data stored in a database, and is provided to the user when ready. In addition, the live report can be stored as a report snapshot in a storage device.

In response to the user's selection of a snapshot, the previously generated report snapshot is retrieved from the storage device and provided to the user. In at least one embodiment, multiple snapshots for the same report can be made available, for example to provide snapshots at different days or times. The user may be free to choose any of them. The system may default to showing the most recent snapshot (unless the user specifies a different one).

The described techniques thus provide users with additional options as to how to request and view reports, thereby increasing the quality of the customer experience by providing the option to view previously generated report snapshots more quickly than newly-generated live reports. The described techniques also increase the efficiency of report generation, and can reduce load and cost of running report generation servers. In particular, the described techniques provide improved performance time in situations where multiple users in multiple locations may be requesting the same report.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
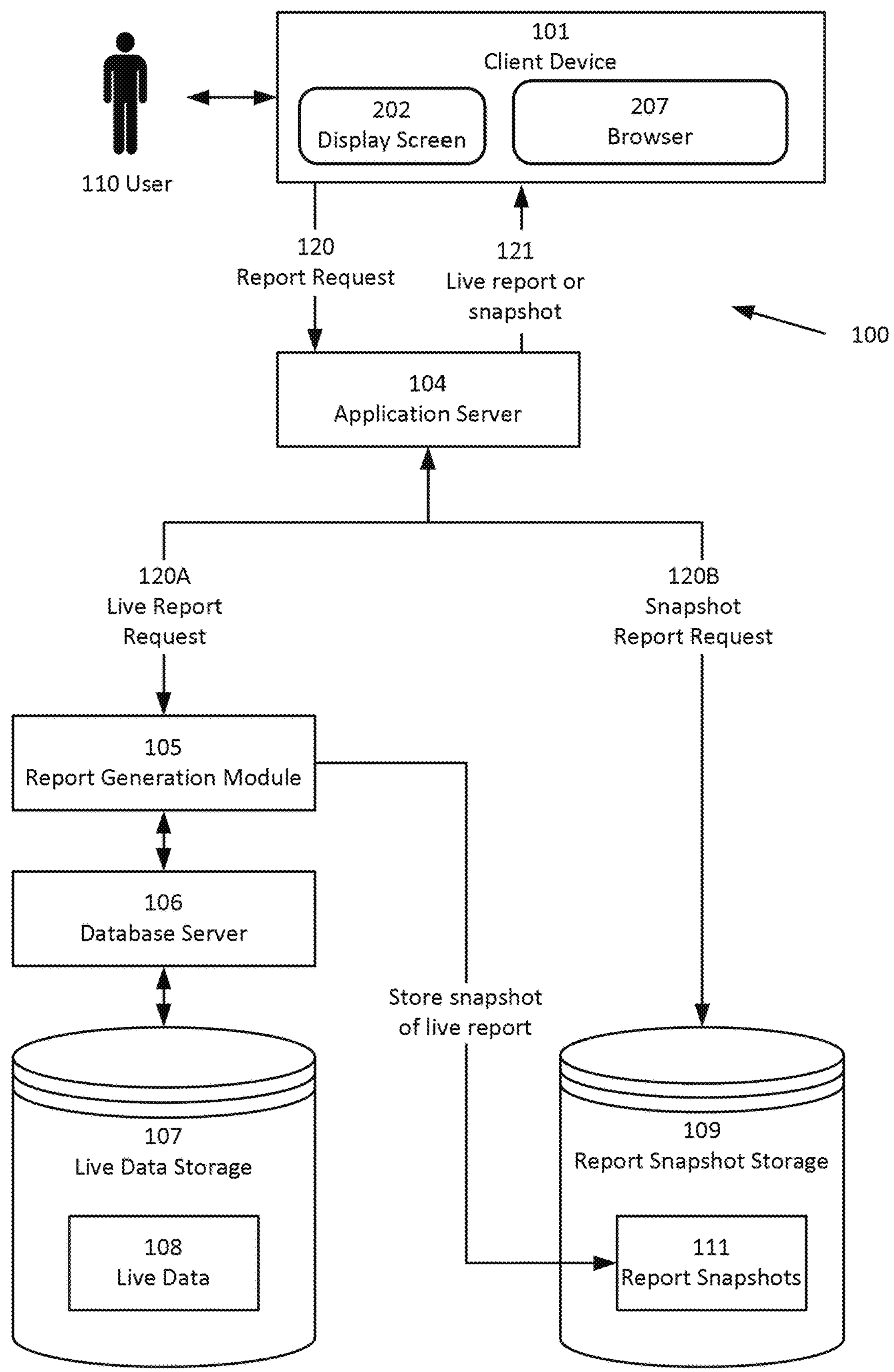
FIG. 1 is a block diagram depicting a hardware architecture for generating, retrieving, and displaying report snapshots, according to one embodiment.

The systems and methods set forth herein may be applied to many contexts in which reports are generating in response to user requests. For illustrative purposes, the description herein is set forth with respect to a cloud computing-based architecture, such as may be used with cloud-based Enterprise Resource Planning (ERP) software. However, one skilled in the art will recognize that the techniques described herein can be applied in many other contexts, and in fact are applicable in any situation wherein report generation may be a lengthy and/or cumbersome process. In addition, the particular hardware arrangement depicted and described herein is a simplified example for illustrative purposes.

In some embodiments, one or more components, such as client device 101, application server 104, report generation module 105, database server 106, and other components as shown and described in connection with FIGS. 1 and 2, may be used to implement the system and method described herein. For illustrative purposes, therefore, the system and method may be described in the context of such a cloud computing-based client/server architecture. One skilled in the art will recognize, however, that the system and method can be implemented using other architectures, such as for example a stand-alone computing device or distributed computing system, rather than a client/server architecture.

Further, the functions and/or method steps set forth below may be carried out by software running on one or more of client devices 101, application server 104, report generation module 105, and/or database server 106. This software may optionally be multi-function software that is used to receive and respond to requests for reports, as well as to retrieve, store, manipulate, and/or otherwise use data stored in data storage devices such as live data storage 107 and/or report snapshot storage 109, and/or to carry out one or more other functions.

In this description, a "user" (such as user 110) is an individual, enterprise, or other group, which may optionally include one or more users. A "data store" is any device capable of digital data storage. A data store may use any known hardware for nonvolatile and/or volatile data storage. A "data storage system" is a collection of data stores that can be accessed by multiple users. A "computing device" is any device capable of digital data processing. A "server" is a computing device that provides data storage, either via a local data store, or via connection to a remote data store. A "client device" is an electronic device that communicates with a server, provides output to a user, and accepts input from a user.

System Architecture

According to various embodiments, the system and method can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for a system 100 for generating, retrieving, and displaying report snapshots, according to one embodiment.

Client device(s) 101, application server 104, report generation module 105, and database server 106 may be any suitable electronic devices configured to perform the steps described herein. In at least one embodiment, client device 101 includes functionality for running a browser 207 or similar software for accessing websites over a network such as the Internet. Display screen 202 is an example of an output device that can be used for generating output for user 110. In at least one embodiment, reports generated by report generation module 105 and/or retrieved from report snapshot storage 109 may be presented on display screen 202 using browser 207 or any other suitable software.

As mentioned above, in at least one embodiment, system 100 is implemented in the context of a cloud computing environment. Such an environment involves the use of a network of remote servers that communicate with one another via a network such as the Internet, in order to perform the functions and operations described herein. In at least one embodiment, the cloud computing environment is implemented in an elastic environment that allocates resources automatically in response to need, thus allowing for improved adaptability to changing conditions in workload and demands. One example of such a cloud computing environment is Amazon Web Services, an on-demand cloud computing platform available from Amazon.com, Inc. of Seattle, Wash.

One skilled in the art will recognize, however, that system 100 can be implemented using other architectures and techniques, and that the particular cloud computing architecture described herein is merely exemplary.

In at least one embodiment, system 100 includes one or more data store(s), such as live data storage 107 and report snapshot storage 109, each of which can store data according to any suitable protocol. As described in more detail below, live data storage 107 stores live data 108 as may be used by database server 106 in generating live reports (i.e., reports based on current data). Report snapshot storage 109 stores report snapshots 111 that may be made available to client device 101 upon request by user 110.

These components can be combined with one another or implemented separately, either in the same location or in different locations. In at least one embodiment, data in storage devices such as live data storage 107 and report snapshot storage 109 can be organized into one or more databases. Each database may include one or more well-ordered data sets, which may include data records, metadata, and/or other data (not shown). Each data set may include one or more data entries. However, database and data stores, such as live data storage 107 and report snapshot storage 109, can have any suitable structure. Accordingly, the particular organization of data in such data store(s) need not resemble the form in which information from the data store(s) is displayed to user 110. In at least one embodiment, an identifying label is also stored along with each data entry, to be displayed along with each data entry. In at least one embodiment, a collection of such data stores can be implemented as a data storage system for access by multiple users 110, client devices 101, and/or servers (such as application server 104 and database server 106).

In at least one embodiment, live data storage 107 and report snapshot storage may be organized in a file system, using well known storage architectures and data structures, such as relational databases. Examples include Oracle, MySQL, and PostgreSQL. Appropriate indexing can be provided to associate data elements in such data store(s) with each other. In at least one embodiment, such data store(s) may be implemented using cloud-based storage architectures such as NetApp (available from NetApp, Inc. of Sunnyvale, Calif.) and/or Google Drive (available from Google, Inc. of Mountain View, Calif.).

In various embodiments, client device(s) 101, application server 104, report generation module 105, database server 106, and other components of system 100 can communicate with one another via any suitable communications network, such as the Internet, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, browser 106 running on client device 101 transmits requests for reports via the communications network, and receives responses from application server 104 containing the requested reports, which many include live reports and/or report snapshots, as described in more detail below. Such requests may be sent via HTTP as remote procedure calls or the like. The communications network may employ any known technologies to ensure secure communications between client device(s) 101 and application server 104, as well as among other components of system 100. The various components depicted in FIG. 1 may each have suitable communication interface functionality to enable secure communication with other components.

In some embodiments, data within live data storage 107 and report snapshot storage 109 may be distributed among multiple data storage devices, according to well known techniques. Thus, live data storage 107 and report snapshot storage 109 as depicted in FIG. 1 may each represent one or more physical storage locations, which may communicate with each other via the communications network and/or one or more other networks (not shown). In addition, application server 104, report generation module 105, and database server 106, as depicted in FIG. 1 may each represent one or more physical component(s), which may communicate with each other via the communications network and/or one or more other networks (not shown). System 100 may operate with any number of client device(s) 101.

As described in more detail below, client device 101, under the direction of user 110, can issue a report request 120, which is transmitted to application server 104. Request 120 is handled differently depending on whether it is a live report request 120A or a report snapshot request 120B. Live report requests 120A result in report generation module 105 generating a live report using live data 108 from live data storage 107. Report snapshot requests 120B are handled by retrieving report snapshot 111 from report snapshot storage 109.

Figure 2:
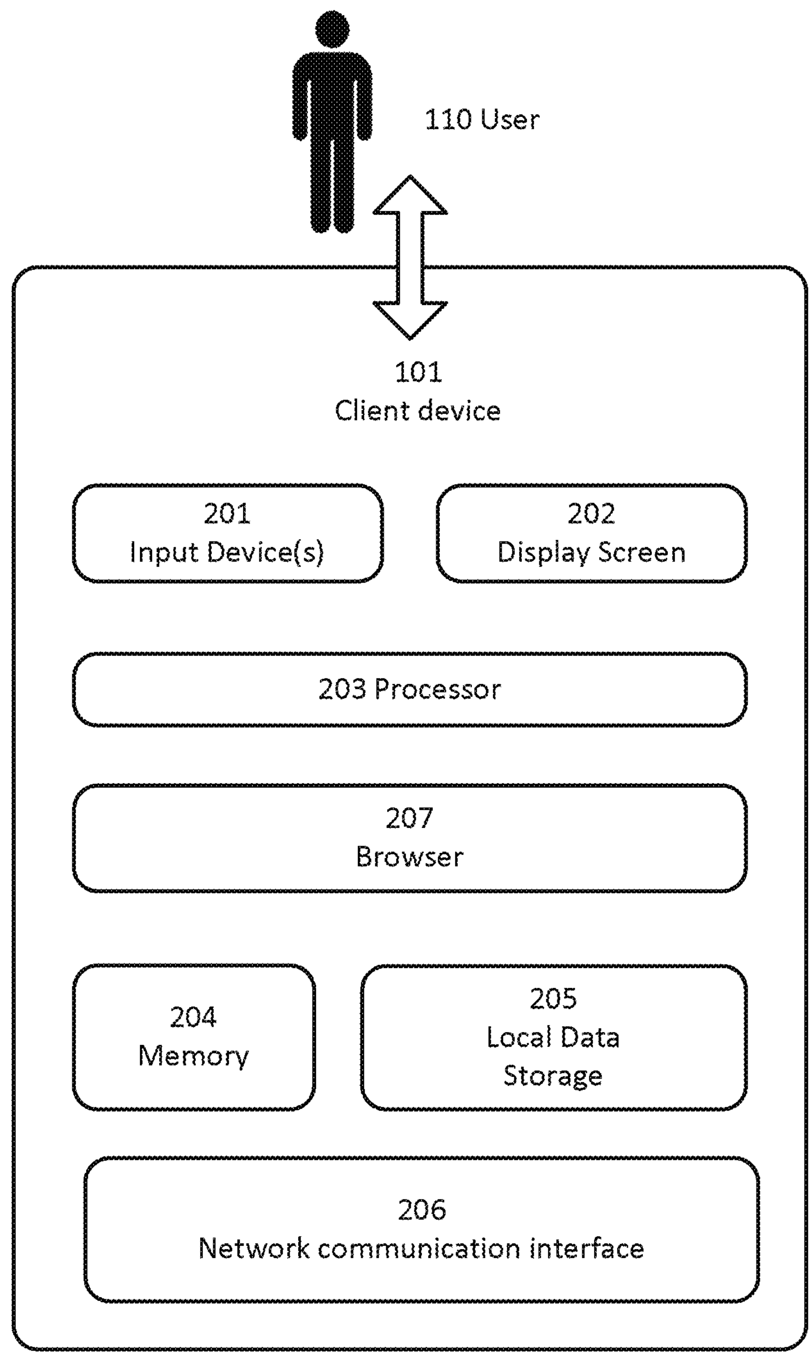
FIG. 2 is a block diagram depicting a hardware architecture for a client device that can be used in connection with a system for generating, retrieving, and displaying report snapshots, according to one embodiment.

Referring also to FIG. 2, there is shown a block diagram depicting a hardware architecture for a client device 101 that can be used in connection with the overall architecture depicted in FIG. 1, according to one embodiment. User 110 interacts with client device 101 by providing input to device 201 and by viewing output presented by device 101 (via display screen 202 and/or other components). Such interactions are described in more detail herein.

In at least one embodiment, client device 101 can be any suitable electronic device and can include a number of hardware components that are well-known to those skilled in the art. Input device(s) 201 can include any element(s) that receive input from user 110, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Display screen 202 can be any element that graphically displays information, such as reports generated by report generation module 105 and/or retrieved from report snapshot storage 109, as well as user interface elements that can facilitate interaction with such information. In at least one embodiment where only some of the desired output is presented at a time, a dynamic control, such as a scrolling mechanism, may be available via input device(s) 201 to change which information is currently displayed, and/or to alter the manner in which the information is displayed.

Local data storage 205 can be any magnetic, optical, or electronic storage device for data in digital form; examples include magnetic hard drive, CD-ROM, DVD-ROM, flash drive, USB hard drive, or the like. In various embodiments, local data storage 205 is detachable or removable from client device 101, or it may be fixed within client device 101.

In at least one embodiment, local data storage 205 stores information that can be utilized and/or displayed according to the techniques described herein. Local data storage 205 may be implemented in a database or using any other suitable arrangement. In another embodiment, data can be stored elsewhere, and retrieved by client device 101 when needed for presentation to user 110. Local data storage 205 may store one or more data sets, which may be used for a variety of purposes and may include a wide variety of files, records, and/or other data. In at least one embodiment, data can be stored in local data storage 205, either in whole or in part, instead of or in addition to being stored at data store(s) such as live data storage 107 and/or report snapshot storage 109.

In some embodiments, data stored in live data storage 107, report snapshot storage 109, and/or local data storage 205 can include elements distributed between client device 101 and/or other components in order to facilitate secure and/or effective communication between these devices. In some embodiments, such records may all be stored primarily on server-based storage (such as live data storage 107 and/or report snapshot storage 109), and may be downloaded to client device 101 when needed by the user 110 for viewing and/or modification according to the techniques described herein. When viewing or modification is complete, the records may be updated on server-based storage. The corresponding copies of the records on client device 101 may be deleted or retained.

Local data storage 205 can be local or remote with respect to the other components of client device 101. In at least one embodiment, client device 101 is configured to retrieve data from a remote data storage device when needed. Such communication between client device 101 and other components can take place wirelessly, by Ethernet connection, via a computing network such as the Internet, via a cellular network, or by any other appropriate means.

Processor 203 can be a conventional microprocessor for performing operations on data under the direction of software, according to well-known techniques. Memory 204 can be random-access memory, having a structure and architecture as are known in the art, for use by processor 203 in the course of running software, presenting information to user 110, receiving input from user 110, and/or communicating with other components of the system. Network communication interface 206 is an interface that enables communication with other components of system 100 via any suitable electronic network, using techniques that are known in the art.

In at least one embodiment, the system is implemented using a "black box" approach, whereby data storage and processing are done independently from user input/output. An example of such an approach is a web-based implementation, wherein client device 101 runs browser 207 that provides a user interface for requesting, receiving, and viewing reports 121 as may be provided by application server 104 in response to requests 120. Reports from application server 104 can be presented as part of such web pages and/or other web-based resources, using known protocols and languages such as Hypertext Markup Language (HTML), Java, JavaScript, and the like.

Client device 101 can be any electronic device incorporating the elements depicted in FIG. 2, such as a desktop computer, laptop computer, personal digital assistant (PDA), cellular telephone, smartphone, music player, handheld computer, tablet computer, kiosk, game system, wearable device, or the like.

Method

Figure 3:
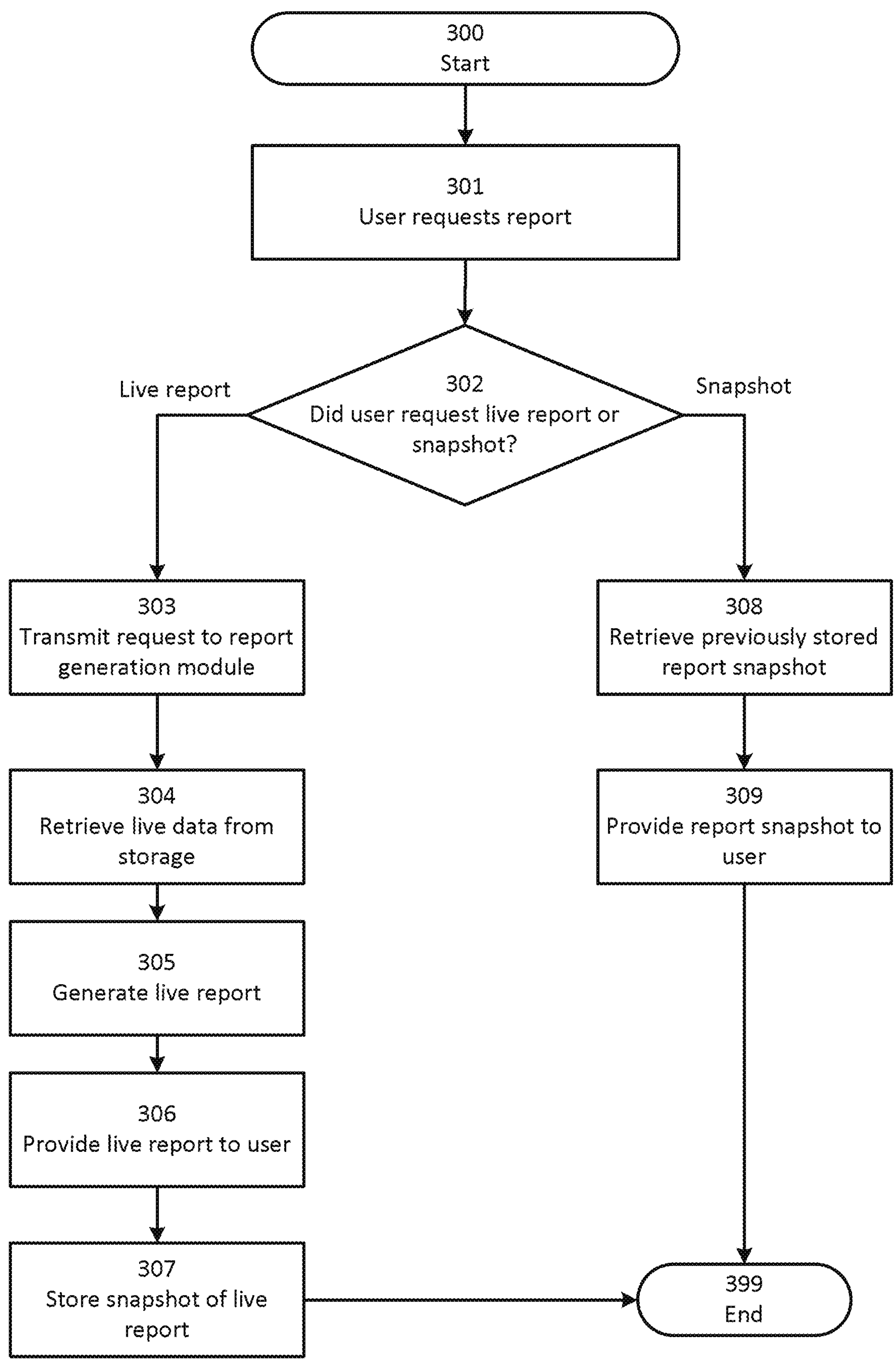
FIG. 3 is a flow diagram depicting a method for generating, retrieving, and displaying report snapshots, according to one embodiment.

Referring now to FIG. 3, there is shown a flow diagram depicting a method for generating, retrieving, and displaying report snapshots, according to one embodiment. In at least one embodiment, the method of FIG. 3 is implemented in a hardware architecture as described above and as depicted in FIGS. 1 and 2; however, one skilled in the art will recognize that the method can be performed using other architectures.

Any of the different components depicted in FIGS. 1 and 2, and/or other components, may perform the various steps depicted in FIG. 3, in any suitable sequence or combination.

The method begins 300. User 110 requests 301 a report, for example by interacting with a user interface of cloud-based Enterprise Resource Planning (ERP) software, accounting software, or the like. The request can be made using any suitable user interface element or elements, and can include, for example, selecting a preconfigured report or requesting a customized report. Step 301 can also include specifying particular parameters or settings for the report, such as fields to be displayed, dates, report type, and/or the like. The requested report can be graphical or text-based, or some combination thereof.

In at least one embodiment, a user interface offers user 110 a choice between generating a live report or a snapshot that was previously generated and stored. In at least one embodiment, such options are available whenever a report is being requested. In other embodiments, such options can be made available when a report may take a long time to generate, so as to give user 110 an option to obtain the report more quickly by requesting a snapshot. In at least one embodiment, the system can automatically select a snapshot, or default to a snapshot, if the time it would take to generate a particular requested report would exceed a predetermined threshold. In at least one embodiment, user 110 can override such default selection if desired. In at least one embodiment, if no snapshot for the requested report is available, the system can suggest snapshots of alternative reports that are similar to, or related to, the report requested by user 110.

In step 302, the system determines whether user 110 requested a live report or a snapshot. If user 110 requested a live report, the request is transmitted to report generation module 303, which retrieves 304 live data 108 from live data storage 107. Report generation module 303 then generates 305 a live report using the retrieved data, and provides 306 the live report to user 110. In at least one embodiment, the report is provided 306 to user via application server 104, which transmits the live report to client device 101 for display on screen 202 and/or on a web page displayed by browser 207.

In at least one embodiment, report generation module 105 also stores 307 a snapshot of the generated live report. These report snapshots 111, can be stored, for example, in report snapshot storage 109 for later retrieval if requested.

In at least one embodiment, the snapshot is stored 307 automatically each time a report is generated 305. In another embodiment, the snapshot is stored 307 automatically only if a snapshot of that report has not recently been stored. In yet another embodiment, user 110 can be prompted to indicate whether the snapshot should be stored. In yet another embodiment, snapshots can be automatically generated at periodic intervals, and/or in response to any suitable trigger event(s).

In at least one embodiment, report snapshots 111 are automatically deleted from report snapshot storage 109 after some period of time has elapsed since their generation; for example, they may be deleted a certain number of days or hours after they were generated. In other embodiments, report snapshots 111 are automatically deleted if the number of stored report snapshots 111 for a particular report exceeds a predetermined threshold number. In yet other embodiments, some or all report snapshots 111 are automatically deleted if the storage space used by all stored report snapshots 111 exceeds (or is close to exceeding) available storage. In any of the above embodiments, any suitable technique can be used to select which snapshots 111 to automatically delete, such as the older snapshots 111, or the ones that consume the more storage space, or the ones that are determined to be least likely to be needed. In at least one embodiment, user 110 or an administrator or other authorized entity can be prompted before any such deletion takes place. One skilled in the art will recognize that other events can trigger automatic deletion of report snapshots 111, as appropriate. In yet other embodiments, reports 111 are not automatically deleted, but may be deleted upon request by user 110 or an administrator or other authorized entity.

If, in step 302, user 110 requested a snapshot, then the system retrieves 308 a previously generated report snapshot. In at least one embodiment, multiple snapshots for a particular report may be available, for example if they were stored at different times. If multiple snapshots are available, user 110 may be prompted to select one of them for retrieval and display. Alternatively, the most recently stored snapshot can automatically be retrieved.

The retrieved report snapshot is then provided 309 to user. In at least one embodiment, the report snapshot is provided 309 to user via application server 104, which transmits the report snapshot to client device 101 for display on screen 202 and/or on a web page displayed by browser 207.

The method then ends 399.

User Interface Examples

Referring now to FIGS. 4A through 4D, there are shown screen shots depicting examples of a user interface for selecting between a live report and report snapshots, according to one embodiment. Referring also FIGS. 5A through 5C, there are shown details of the screen shots of FIGS. 4A through 4C, respectively, depicting examples of the user interface for selecting between a live report and report snapshots, according to one embodiment. In at least one embodiment, such a user interface is displayed on display screen 202 of client device 101, and user 110 can interact with the interface using input device(s) 201.

Figure 4A:
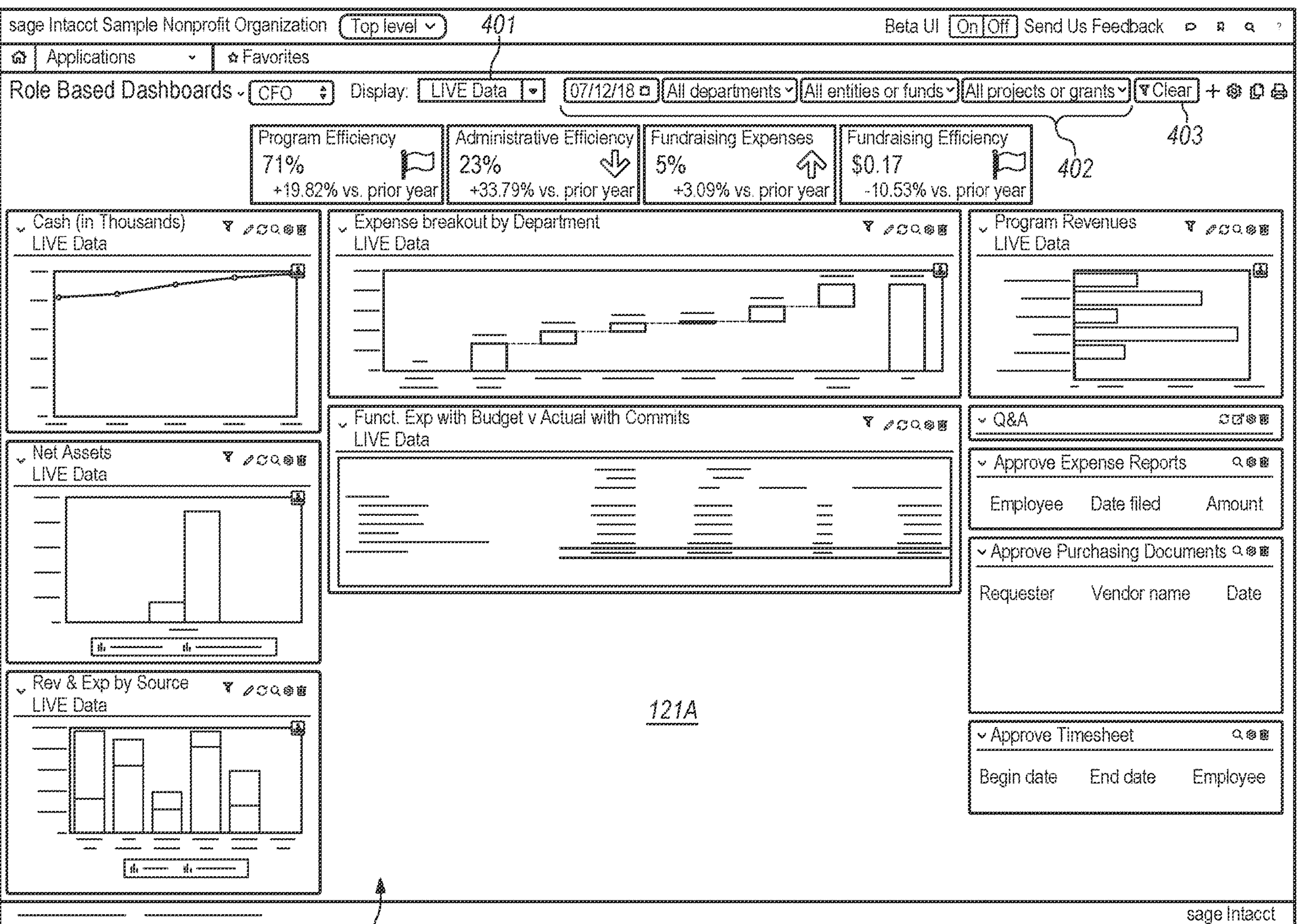
FIGS. 4A through 4D are screen shots depicting examples of a user interface for selecting between a live report and a report snapshot, according to one embodiment.
Figure 5A:
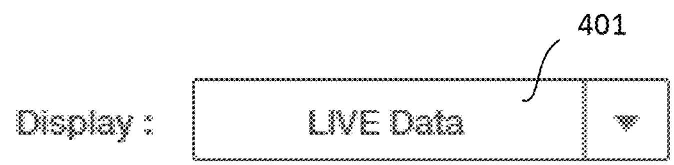
FIGS. 5A through 5C are details of the screen shots of FIGS. 4A through 4C, respectively, depicting examples of the user interface for selecting between a live report and a report snapshot, according to one embodiment.

FIG. 4A depicts an example 400A wherein user 110 has selected live report 121A. Menu 401 provides options for selecting between live and report snapshots, and currently indicates that the live report is being displayed. User interface elements 402 allow user 110 to configure displayed report 121A in various ways, for example to choose particular dates, entries, projects, and/or the like. Button 403 clears the parameters and settings. FIG. 5A depicts a detail of example 400A of FIG. 4A, including menu 401.

In at least one embodiment, when user 110 changes any of these parameters, displayed report 121A is instantly updated. In some cases, this can trigger a request for a new report, which is then displayed for user 110 once it has been received.

Figure 4B:
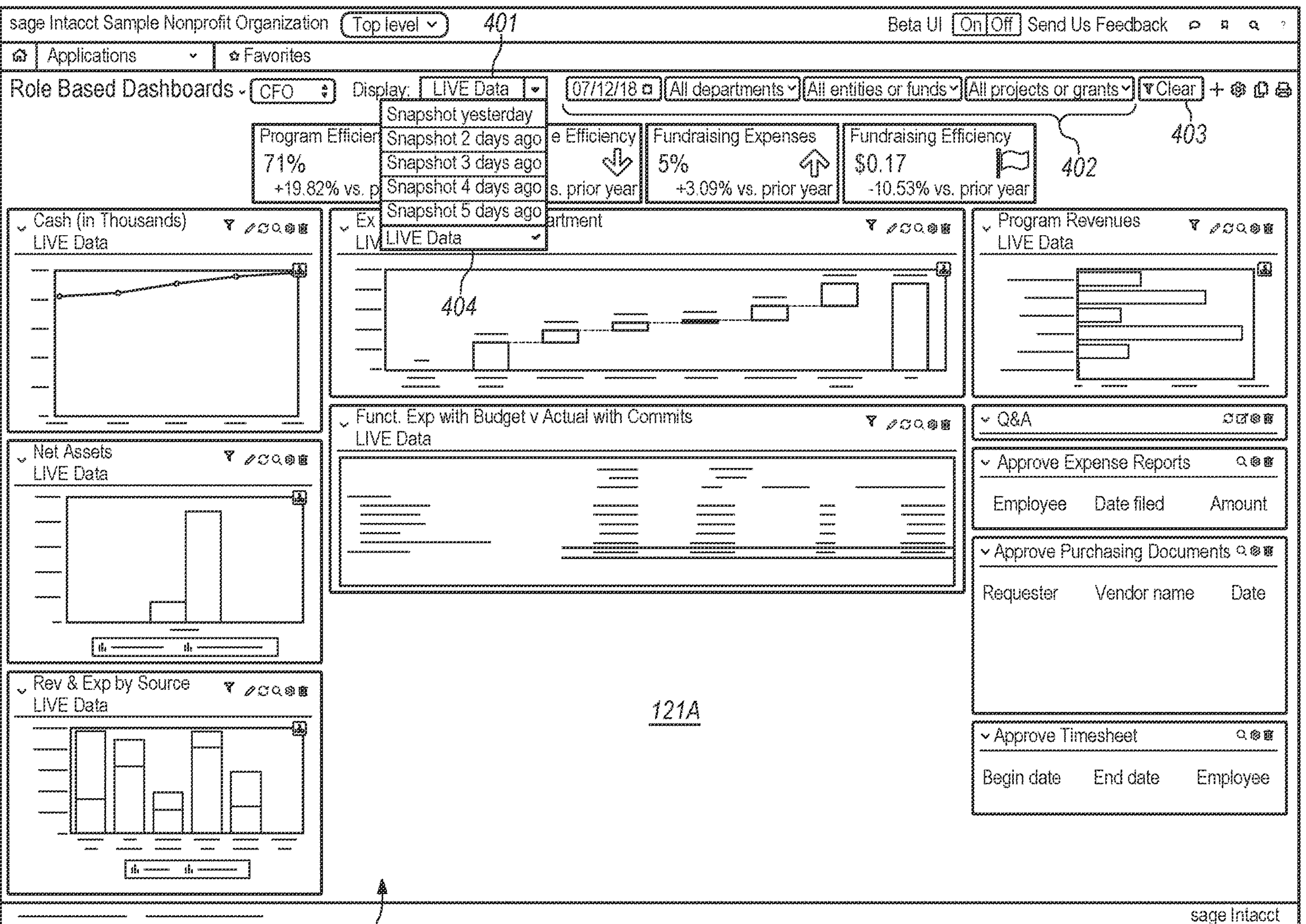
Figure 5B:
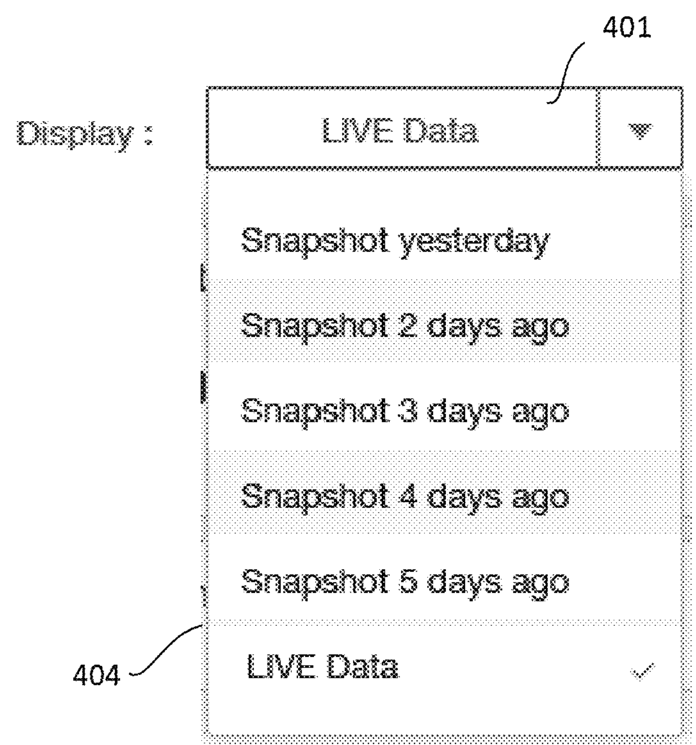
Figure 5C:
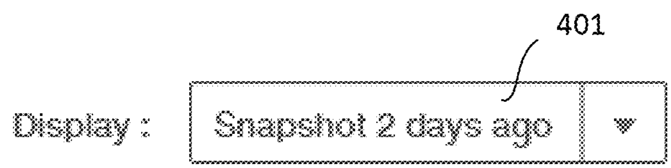

FIG. 4B depicts an example 400B wherein user 110 is in the process of selecting between live report 121A and a report snapshot. User 110 has clicked on menu 401, causing it to display several entries 404 for various previously stored report snapshots as well as a live report. User 110 can select among any of the displayed options to cause the corresponding report to be displayed. FIG. 5B depicts a detail of example 400B of FIG. 4B, including menu 401 containing entries 404.

Figure 4C:
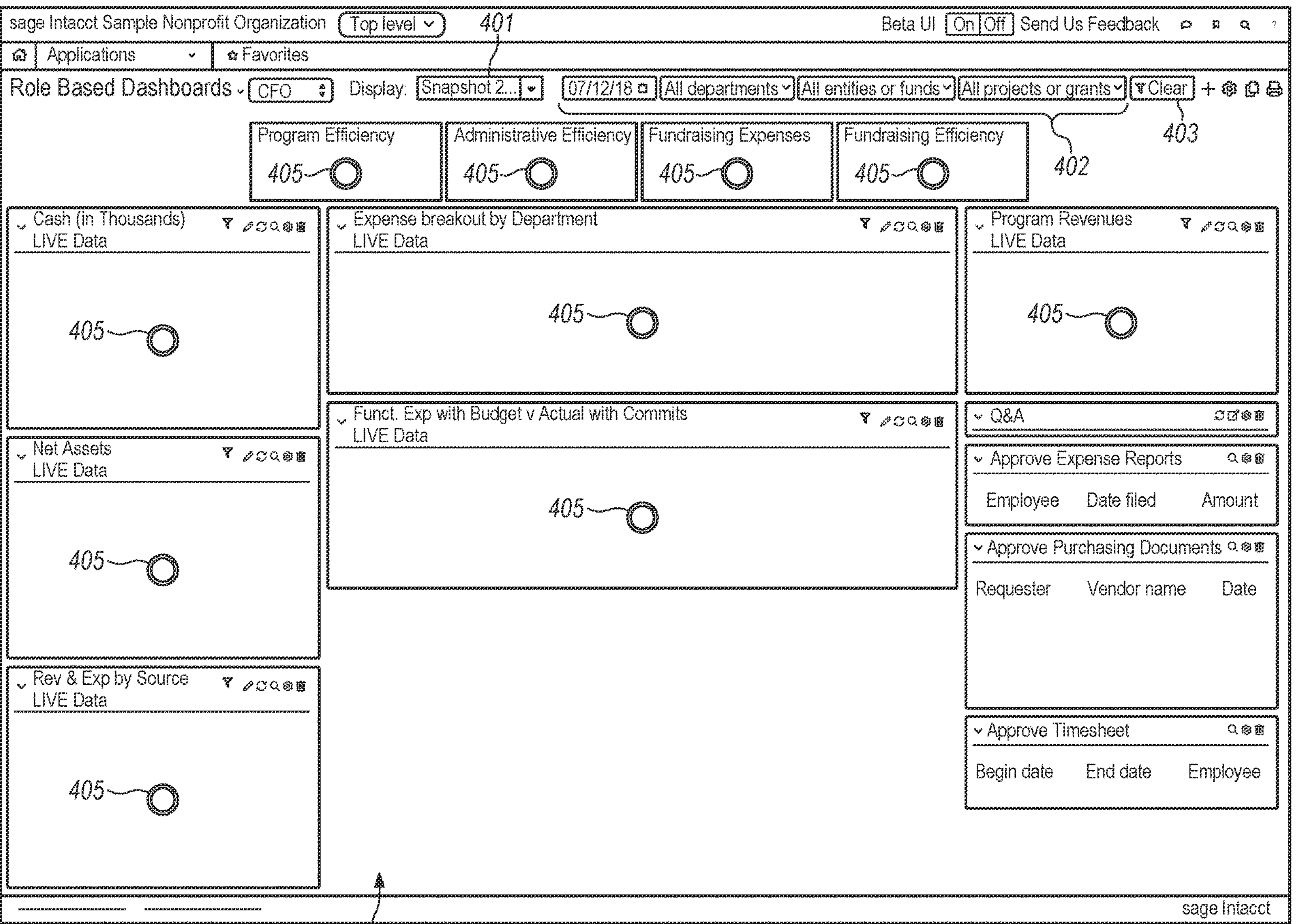

FIG. 4C depicts an example 400C wherein user 110 has selected a report snapshot from two days ago, as shown by the current selection on menu 401. While the snapshot is being retrieved, spinners 405 are shown to indicate to user 110 that the system is in the process of retrieving the requested reports. Other visual elements can be used to indicate to user 110 that the system is in the process of retrieving the requested reports, such as a progress bar, message, countdown timer, a dialog box, and/or the like.

Figure 4D:
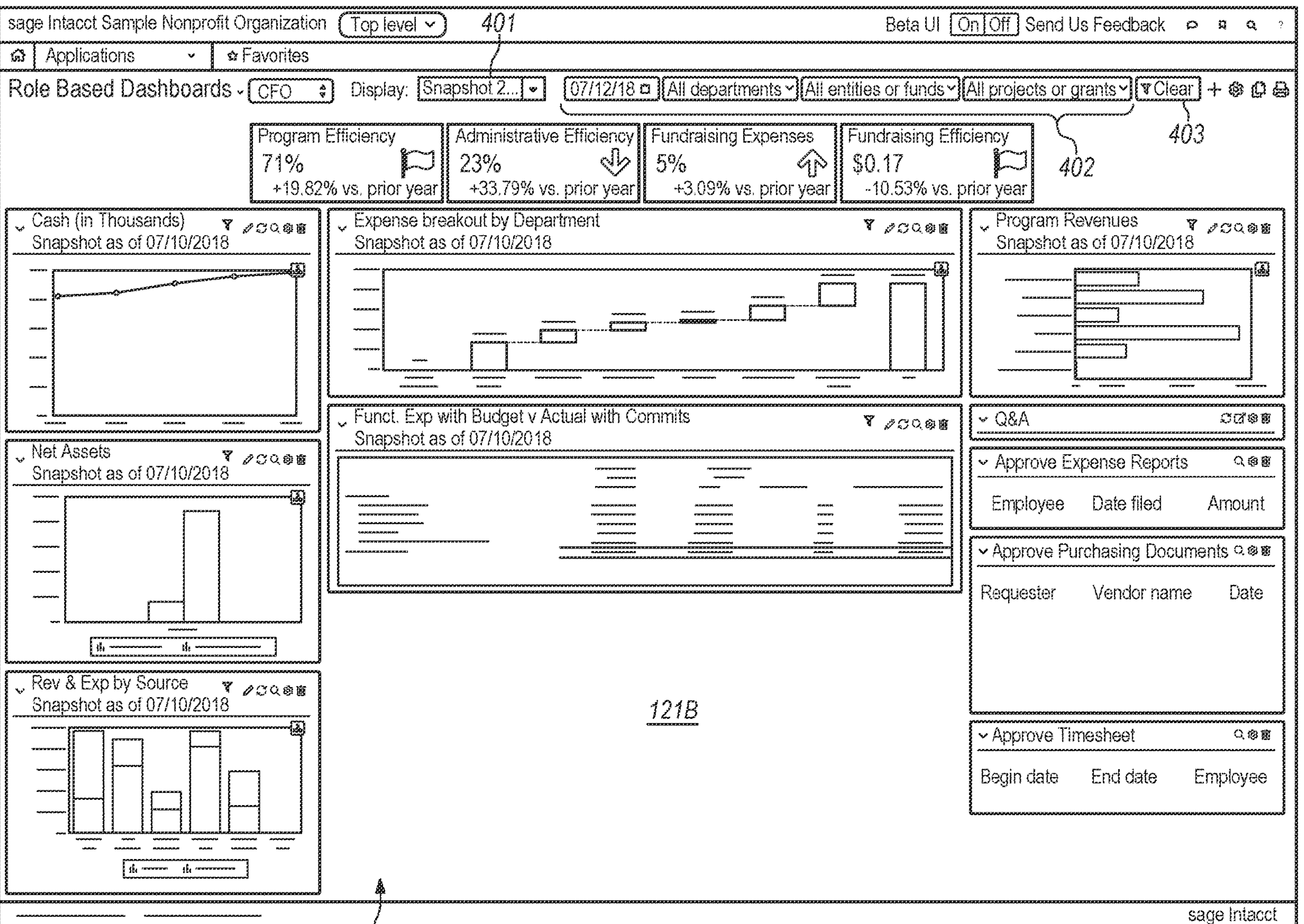

FIG. 4D depicts an example 400D wherein the selected report snapshot 121B (from two days ago) has been retrieved and is displayed.

One skilled in the art will recognize that the screen shots of FIGS. 4A through 4D and 5A through 5C are merely exemplary, and that the user interface can be implemented and arranged in many other ways.

For example, in various alternative embodiments, user 110 may be presented with different ways to select among available report snapshots. In one embodiment, for example, user 110 can be presented with a list of all currently available report snapshots (of all types), even before he or she has requested a particular report, and can select one for viewing. In another embodiment, user 110 can filter, sort, or limit such list based on any desired criteria, or can search for particular reports, so as to make it easy for user 110 to quickly find a report snapshot of interest and cause it to be displayed.

In at least one embodiment, for each such report snapshot, the system can also present to user 110 a visual indication of how recently the report snapshot was generated. This "freshness" indicator can be presented graphically, as an icon, and/or in text form. In at least one embodiment, the system can also present an indication of how long it would take to generate a corresponding live report. In this manner, the system allows user 110 to make an informed choice as to whether to view a report snapshot or request a live report, based on "freshness" of the snapshot, and estimated time burden associated with generating a live report.

In at least one embodiment, before giving user 110 an option to select between a live report and a report snapshot, the system may optionally make a preliminary determination as to an estimated time to generate a live report. In at least one embodiment, the system presents the report snapshot option only if a live report would take a long time to generate; if the live report can be generated relatively quickly (such as, in less time than a predetermined threshold time period), the system does not present the report snapshot option. It at least one embodiment, the threshold time period can be configured by user 110, or by a system administrator or other entity.

For example, if the threshold time period is ten seconds, then, upon receiving a request for a report, the system makes a determination as to the estimated time to generate a live report. If the live report would take more than ten seconds, then the system presents an option to display a report snapshot (if such report snapshot is available). If the live report would take ten seconds or less to generate, then the system does not present an option to display a report snapshot.

In at least one embodiment, before giving user 110 an option to select between a live report and a report snapshot, the system may optionally determine whether a report snapshot is available for the desired report. In at least one embodiment, the system presents the report snapshot option only if a report snapshot is available. In at least one embodiment, the system determines the age of the most recently generated report snapshot, and compares the age against a predetermined threshold age; the system presents the report snapshot option only if the age of the report is less than the threshold age. Thus, the system avoids presenting the snapshot option if report snapshots are not available, or if they are out of date.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for generating and presenting reports, comprising:

receiving, via an input device, a user request for a report;

determining an estimated time to generate a live version of the report;

comparing the determined estimated time to a predetermined threshold time;

responsive to the comparison indicating that the determined estimated time exceeds the predetermined threshold time:

displaying, on an output device, a request that the user select between the live version of the report and at least one previously stored report snapshot;

receiving, via the input device, input from the user indicating the user's selection between the live version and the at least one previously stored report snapshot;

responsive to the input indicating that the user has selected the live version:

retrieving data for generation of the live version of the report;

generating the live version of the report using the retrieved data; and on the output device, outputting the generated live version of the report; and responsive to the input indicating that the user has selected the at least one previously stored report snapshot:

retrieving, from an electronic storage device, the at least one selected previously stored report snapshot; and on the output device, outputting the at least one retrieved previously stored report snapshot; and responsive to the comparison indicating that the determined estimated time does not exceed the predetermined threshold time:

retrieving data for generation of the live version of the report;

generating the live version of the report using the retrieved data; and outputting the generated live version of the report.

2. The method of claim 1 further comprising, responsive to input indicating that the user has selected the live version:

storing the generated live version as an additional report snapshot in the electronic storage device; and storing, in the electronic storage device, an indication of the time at which the additional report snapshot was generated.

3. The method of claim 1 further comprising, periodically:

generating an additional snapshot of the report, wherein the additional report snapshot represents an additional version of the report at a given point in time; and storing, in the electronic storage device, the generated additional report snapshot and an indication of the time at which the additional report snapshot was generated.

4. The method of claim 1 further comprising:

determining whether any previously stored report snapshots are of an age that exceeds a predetermined threshold age; and responsive to a previously stored report snapshot being of an age that exceeds the predetermined threshold age, automatically deleting the stored report snapshot from the electronic storage device.

5. The method of claim 1 further comprising:

determining whether the number of previously stored report snapshots corresponding to a particular report exceeds a predetermined threshold number; and responsive to the number of previously stored report snapshots corresponding to a particular report exceeding the predetermined threshold number, automatically deleting at least one of the stored report snapshots from the electronic storage device.

6. The method of claim 1 further comprising:

subsequently to receiving the user request for the report, determining whether at least one report snapshot is available for the requested report;

and wherein the steps of displaying the request that the user select between the live version of the report and at least one previously stored report snapshot, and receiving input indicating the user's selection, are performed responsive to a determination that at least one report snapshot is available for the requested report.

7. The method of claim 1 further comprising:

subsequently to receiving the user request for the report, determining whether at least one report snapshot of an age less than a predetermined threshold age is available for the requested report;

and wherein the steps of displaying the request that the user select between the live version of the report and at least one previously stored report snapshot, and receiving input indicating the user's selection, are performed responsive to a determination that at least one report snapshot of an age less than a predetermined threshold age is available for the requested report.

8. The method of claim 1 wherein:

displaying the request that the user select between the live version of the report and at least one previously stored report snapshot comprises displaying a request that the user select between the live version of the report and a plurality of previously stored report snapshots; and receiving input from the user indicating the user's selection between the live version and the at least one previously stored report snapshot comprises receiving input from the user indicating the user's selection between the live version and a particular one of the plurality of previously stored report snapshots.

9. The method of claim 8, wherein displaying the request that the user select between the live version of the report and the plurality of previously stored report snapshots comprises outputting an indication of the time at which each of the previously stored report snapshots was generated.

10. The method of claim 1 wherein displaying the request that the user select between the live version of the report and at least one previously stored report snapshot comprises displaying a menu comprising a selection for the live version of the report and a selection for each previously stored report snapshot.

11. The method of claim 1 wherein:

the steps of receiving the user request for the report, displaying the request that the user select between the live version and the at least one previously stored report snapshot, receiving input from the user indicating the user's selection, outputting the generated live version, and outputting the retrieved previously stored report snapshot are performed on at least one client device; and the steps of generating at least one snapshot of the report, retrieving data for generation of the live version of the report, generating the live version of the report, and retrieving the selected previously stored report snapshot are performed on at least one server.

12. The method of claim 1 wherein:

the steps of receiving the user request for the report, displaying the request that the user select between the live version and the at least one previously stored report snapshot, receiving input from the user indicating the user's selection, outputting the generated live version, and outputting the retrieved previously stored report snapshot are performed on at least one client device;

the step of retrieving data for generation of the live version of the report is performed on a database server;

the step of generating the live version of the report is performed on a report generation module; and the step of retrieving the selected previously stored report snapshot is performed on an application server.

13. The method of claim 1 wherein:

the step of outputting the generated live version of the report comprises transmitting the generated live version of the report from an application server to a client for presentation to the user on the client; and the step of outputting the retrieved previously stored report snapshot comprises transmitting the retrieved report snapshot from an application server to a client for presentation to the user on the client.

14. The method of claim 1 wherein generating at least one snapshot of a report comprises generating at least one report snapshot in response to a request for a report from a second user other than the requesting user.

15. A non-transitory computer-readable medium for generating and presenting reports, comprising instructions stored thereon, that when executed by one or more processors, perform the steps of:

causing an input device to receive a user request for a report;

determining an estimated time to generate a live version of the report;

comparing the determined estimated time to a predetermined threshold time;

responsive to the comparison indicating that the determined estimated time exceeds the predetermined threshold time:

causing an output device to display a request that the user select between the live version of the report and at least one previously stored report snapshot;

causing the input device to receiving input from the user indicating the user's selection between the live version and the at least one previously stored report snapshot;

responsive to the input indicating that the user has selected the live version:

retrieving data for generation of the live version of the report;

generating the live version of the report using the retrieved data; and causing the output device to output the generated live version of the report; and responsive to the input indicating that the user has selected the at least one previously stored report snapshot:

retrieving, from an electronic storage device, the at least one selected previously stored report snapshot; and causing the output device to output the at least one retrieved previously stored report snapshot; and responsive to the comparison indicating that the determined estimated time does not exceed the predetermined threshold time:

retrieving data for generation of the live version of the report;

generating the live version of the report using the retrieved data; and causing the output device to output the generated live version of the report.

16. The non-transitory computer-readable medium of claim 15, further comprising instructions stored thereon, that when executed by one or more processors, perform the steps of, responsive to input indicating that the user has selected the live version:

causing the electronic storage device to store the generated live version as an additional report snapshot; and causing the electronic storage device to store an indication of the time at which the additional report snapshot was generated.

17. The non-transitory computer-readable medium of claim 15, further comprising instructions stored thereon, that when executed by one or more processors, perform the steps of, periodically:

generating an additional snapshot of the report, wherein the additional report snapshot represents an additional version of the report at a given point in time; and causing the storage device to store the generated additional report snapshot and an indication of the time at which the additional report snapshot was generated.

18. The non-transitory computer-readable medium of claim 15, further comprising instructions stored thereon, that when executed by one or more processors, perform the steps of:

determining whether any previously stored report snapshots are of an age that exceeds a predetermined threshold age; and responsive to a previously stored report snapshot being of an age that exceeds the predetermined threshold age, automatically causing the electronic storage device to delete the stored report snapshot.

19. The non-transitory computer-readable medium of claim 15, further comprising instructions stored thereon, that when executed by one or more processors, perform the steps of:

determining whether the number of previously stored report snapshots corresponding to a particular report exceeds a predetermined threshold number; and responsive to the number of previously stored report snapshots corresponding to a particular report exceeding a predetermined threshold number, automatically causing the electronic storage device to delete at least one of the stored report snapshots.

20. The non-transitory computer-readable medium of claim 15, further comprising instructions stored thereon, that when executed by one or more processors, perform the steps of:

subsequently to receiving the user request for the report, determining whether at least one report snapshot is available for the requested report;

and wherein causing the output device to display the request that the user select between the live version of the report and at least one previously stored report snapshot, and causing the input device to receive input indicating the user's selection, are performed responsive to a determination that at least one report snapshot is available for the requested report.

21. The non-transitory computer-readable medium of claim 15, further comprising instructions stored thereon, that when executed by one or more processors, perform the step of:

subsequently to receiving the user request for the report, determining whether at least one report snapshot of an age less than a predetermined threshold age is available for the requested report;

and wherein causing the output device to display the request that the user select between the live version of the report and at least one previously stored report snapshot, and causing the input device to receive input indicating the user's selection, are performed responsive to a determination that at least one report snapshot of an age less than a predetermined threshold age is available for the requested report.

22. The non-transitory computer-readable medium of claim 15, wherein:

causing the output device to display the request that the user select between the live version of the report and at least one previously stored report snapshot comprises causing the output device to display the request that the user select between the live version of the report and a plurality of previously stored report snapshots; and causing the output device to display the request that the user select between the live version of the report and at least one previously stored report snapshot comprises causing the input device to receive the user's selection between the live version and a particular one of the plurality of previously stored report snapshots.

23. The non-transitory computer-readable medium of claim 22, wherein causing the output device to display the request that the user select between the live version of the report and a plurality of previously stored report snapshots comprises causing the output device to output the age of each of the previously stored report snapshots.

24. The non-transitory computer-readable medium of claim 15, wherein causing the output device to display the request that the user select between the live version of the report and at least one previously stored report snapshot comprises causing the output device to display a menu comprising a selection for the live version of the report and a selection for each previously stored report snapshot.

25. A system for generating and presenting reports, comprising:

an input device, configured to receive a user request for a report;

an output device;

an electronic storage device, configured to store at least one report snapshot, wherein each report snapshot represents a version of the report based on data that is current at a given point in time;

a processor, communicatively coupled to the input device, the output device, and the electronic storage device, configured to:

determine an estimated time to generate a live version of the report;

compare the determined estimated time to a predetermined threshold time;

responsive to the comparison indicating that the determined estimated time exceeds the predetermined threshold time:

cause the output device to display a request that the user select between the live version of the report and at least one previously stored report snapshot stored on the electronic storage device;

cause the input device to receive input from the user indicating the user's selection between the live version and the at least one previously stored report snapshot;

responsive to the input indicating that the user has selected the live version:

retrieve data for generation of the live version of the report;

generate the live version of the report using the retrieved data; and cause the output device to output the generated live version of the report; and responsive to the input indicating that the user has selected the at least one previously stored report snapshot:

retrieve, from the electronic storage device, the at least one selected previously stored report snapshot; and cause the output device to output the at least one retrieved previously stored report snapshot; and responsive to the comparison indicating that the determined estimated time does not exceed the predetermined threshold time:

retrieve data for generation of the live version of the report;

generate the live version of the report using the retrieved data; and cause the output device to output the generated live version of the report.

26. The system of claim 25, wherein the electronic storage device is further configured to, responsive to the user selecting the live version:

store the generated live version as an additional report snapshot; and store an indication of the time at which the additional report snapshot was generated.

27. The system of claim 25, wherein:

the processor is configured to periodically generate an additional snapshot of the report, wherein the additional report snapshot represents an additional version of the report at a given point in time, the system further comprising: and the electronic storage device is further configured to store the generated additional report snapshot and an indication of the time at which the additional report snapshot was generated.

28. The system of claim 25, wherein the processor is further configured to:

determine whether any previously stored report snapshots are of an age that exceeds a predetermined threshold age; and responsive to a previously stored report snapshot being of an age that exceeds the predetermined threshold age, automatically cause the electronic storage device to delete the stored report snapshot.

29. The system of claim 25, wherein the processor is further configured to:

determine whether the number of previously stored report snapshots corresponding to a particular report exceeds a predetermined threshold number; and responsive to the number of previously stored report snapshots corresponding to a particular report exceeding the predetermined threshold number, automatically cause the storage device to delete at least one of the stored report snapshots.

30. The system of claim 25, wherein the processor is further configured to:

subsequently to the input device receiving the user request for the report, determine whether at least one report is available for the requested report; and responsive to a determination that at least one report snapshot is available for the requested report, cause the output device to display the request that the user select between the live version of the report and at least one previously stored report snapshot, and cause the input device to receive the user's selection.

31. The system of claim 25, wherein the processor is further configured to:

subsequently to the input device receiving the user request for the report, determine whether at least one report snapshot of an age less than a predetermined threshold age is available for the requested report; and responsive to a determination that at least one report snapshot of an age less than a predetermined threshold age is available for the requested report, cause the output device to display the request that the user select between the live version of the report and at least one previously stored report snapshot, and cause the input device to receive the user's selection.

32. The system of claim 25, wherein:

displaying the request that the user select between the live version of the report and at least one previously stored report snapshot comprises displaying a request that the user select between the live version of the report and a plurality of previously stored report snapshots; and receiving input from the user indicating the user's selection between the live version and the at least one previously stored report snapshot comprises receiving input from the user indicating the user's selection between the live version and a particular one of the plurality of previously stored report snapshots.

33. The system of claim 32, wherein displaying the request that the user select between the live version of the report and the plurality of previously stored report snapshots comprises outputting an indication of the time at which each of the previously stored report snapshots was generated.

34. The system of claim 25, wherein displaying the request that the user select between the live version of the report and at least one previously stored report snapshot comprises displaying a menu comprising a selection for the live version of the report and a selection for each previously stored report snapshot.

* * * * *